United States Patent [19]

Brennan

[11] 4,386,257
[45] May 31, 1983

[54] ALKALI METAL OXIDE FREE BACKERS FOR ENERGY BEAM DRILLING

[75] Inventor: John J. Brennan, Portland, Conn.

[73] Assignee: United Technologies Corporation, Hartford, Conn.

[21] Appl. No.: 239,275

[22] Filed: Mar. 2, 1981

[51] Int. Cl.³ .............................................. B23K 27/00
[52] U.S. Cl. .............................................. 219/121 EH
[58] Field of Search ................. 219/121 LK, 121 LC, 219/121 LM, 121 L, 121 EH, 121 EB, 121 EM; 252/518, 521; 106/84; 501/17, 20, 35, 54, 64; 524/492

[56] References Cited

U.S. PATENT DOCUMENTS

| | | | |
|---|---|---|---|
| 3,640,907 | 2/1972 | Bizzarri | 252/521 |
| 3,649,806 | 3/1972 | Konig | 219/121 EM |
| 3,974,107 | 8/1976 | Carcia | 252/518 X |
| 4,156,807 | 5/1979 | Howard et al. | 219/121 EM |
| 4,239,954 | 12/1980 | Howard et al. | 219/121 EH |
| 4,273,822 | 6/1981 | Bube | 501/17 X |

FOREIGN PATENT DOCUMENTS 1145611  3/1969  United Kingdom .

Primary Examiner—C. L. Albritton
Attorney, Agent, or Firm—C. G. Nessler

[57] ABSTRACT

To prevent corrosion in subsequent high temperature exposure, backers for electron beam hole drilling of nickel base superalloys contain glass particulates of the borosilicate and aluminosilicate types, having an alkali metal oxide content of less than 1 weight percent and a heavy metal (Pb, Bi, Sn, Sb, As) content of less than 25 ppm. Preferably the binder is a soluble inorganic material, such as magnesium dichromate or a polymer, also free of alkali metal content.

4 Claims, 1 Drawing Figure

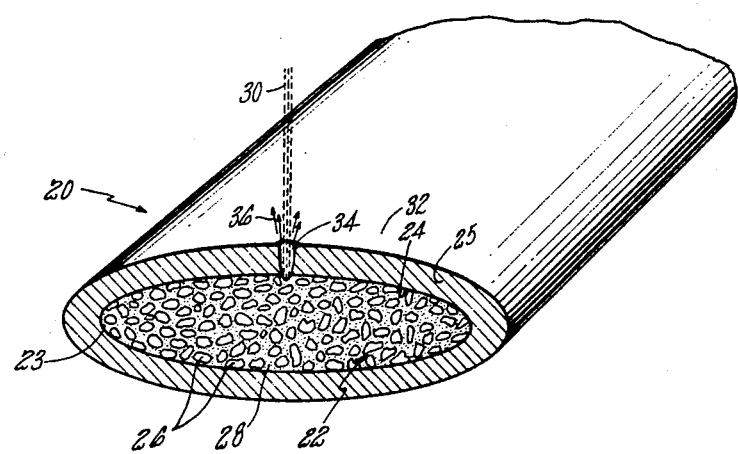

4,386,257

ALKALI METAL OXIDE FREE BACKERS FOR ENERGY BEAM DRILLING

DESCRIPTION

1. Technical Field

The invention relates to ceramic containing backer materials for electron beam hole drilling, most particularly to the preferred types of glass particulates which are included in backers.

A backer is a substance which is applied to the exit surface of a workpiece during hole drilling with an electron beam. It functions to both absorb beam energy, thus avoiding penetration of other surfaces by the beam, and to generate gaseous pressure which helps in producing a good hole configuration.

BACKGROUND ART

For related art, reference should be made to U.S. Pat. No. 4,239,954 "Backer for Electron Beam Hole Drilling", Howard et al of common assignee herewith which discloses the general method by which backers are used. In particular the patent discloses backers having liquifiable organic and inorganic binders. Reference should also be made to application Ser. No. 239,276 "Backers Having Glass Particulates for Electron Beam Hole Drilling", filed on even date hereof by J. J. Brennan and L. W. Jordan, referred to hereinafter as "the copending application". Disclosed therein are backers containing certain glasses with novel characteristics, most notably, those having softening temperatures above 700° C. and having both a high temperature constituent which melts and a low temperature constituent which volatilizes. The present invention is an improvement on the invention of the copending application, and involves backers especially designed for drilling superalloys which are used at high temperatures, such as in gas turbines.

Superalloy parts for gas turbines are often electron beam drilled to create small cooling holes. These parts are then used at high temperatures in oxidizing and corrosive atmospheres either in their natural state or with a coating. When coated, the procedure involves heating to a high temperature. Certain residues in contact with the superalloy during high temperature exposure can react or corrode the superalloy. This can degrade mechanical and corrosion resisting properties of the part and lead to premature failure.

In fact, using backers containing sodium silicate binder with soda lime glass particulate is found to produce such corrosion. This was attributed to the difficulties in removing all backer residue from the cavities of articles such as gas turbine airfoils having many interstices, but it was not known what aspects of the backer were influential, or what particular backer compositions should be used.

DISCLOSURE OF THE INVENTION

An object of the invention is to provide backers which are both non-corrosive to superalloys at high temperatures and have the physical and chemical characteristics necessary to produce well shaped holes in electron beam drilling.

According to the invention, a backer is comprised of a binder and a glass particulate, with the glass particulate having less than 1 weight percent alkali metal oxide. Useful particulates are comprised of borosilicate and aluminosilicate glasses and combinations thereof. They have a high temperature constituent and a low temperature constituent, with the latter being present in at least 7 weight percent to provide sufficient gas or vapor forming characteristics. Preferably, the binder is a polymer or an inorganic soluble material such as magnesium dichromate which is free of alkali metal content.

The invention provides a specialized class of backers which can be safely utilized in the drilling of high performance superalloy parts.

DESCRIPTION OF THE DRAWING

The FIGURE of the drawing shows a workpiece having a backer as it is being electron beam drilled.

BEST MODE FOR CARRYING OUT THE INVENTION

The invention is described in terms of drilling of nickel base alloys using an electron beam, but it will be found applicable to other high temperature corrosion resisting metals based on iron and cobalt, and to drilling with other types of energy beams.

U.S. Pat. No. 4,239,954 is incorporated by reference to describe the general use of backers in energy beam drilling of workpieces. The copending application, Ser. No. 236,276 "Backers Having Glass Particulates for Electron Beam Hole Drilling," supra, is also incorporated by reference. Disclosed therein is the use of certain glass particulates, particularly those having both a high temperature constituent and at least 7 weight percent low temperature constituent together with other physical characteristics which make them particularly suitable for producing well shaped holes. Binders are disclosed which include polyvinyl alcohol, magnesium chromate, and sodium silicate and polymers.

The drawing shows in cross section a tubular shaped workpiece 20 having a backer 22 filling its interior cavity 23, while it is being electron beam drilled. The backer is intimately contacted with the exit surface 24 of the workpiece wall 25 being drilled. The backer is comprised of particulates 26 held together by a matrix of binder 28. An electron beam 30 impacts the entrance surface 32 of the workpiece, and creates a hole 34 therein. As the beam penetrates the exit surface 24 of the workpiece wall it penetrates the backer, thereby volatilizing both the particulates and binder. The backer material is expelled up along, and out of, the hole 34, as indicated by arrows 36. After drilling is completed the backer is removed by degrading the binder, such as by melting, as described in U.S. Pat. No. 4,239,954. Any remaining particulates are removed by flushing from the interior cavity. However, in complex shaped cavities some particles may remain, and it is these which can cause corrosion during subsequent use.

Corrosion tests were conducted for binder and particulate combinations applied to the surface of a representative nickel base superalloy MAR M-200+Hf (9Cr-10Co-2Ti-5Al-0.14C-12.5W-2Hf-1Cb-0.015B-bal Ni), which was then heated to temperatures in the range of 980°–1040° C. for 60–125 hrs. Corrosion was observed by metallography of the workpiece. The test data are shown in Table 1; the compositions of the glasses are presented in Table 2, Pyrex and Vycor are trade names of the Corning Glass Co.; "E" and "S" glass are trade names of the Ferro Corp.; and GS-302 is a trade name of Owens-Illinois Corp. Referring to Table 2 it may seem that the glasses "S" and 1723, are characterizable as aluminosilicates; the glasses Pyrex, 7059, "E" and GS- 302 are borosilicates, or more particularly characterizable as barium borosilicate (7059), aluminoborosilicate ("E" and GS-302), and so forth.

TABLE 1

Corrosion of MAR M-200 + Hf Superalloy in Contact with Certain Ceramic Backer Compositions

| | Binder | Particulate | Heat Treatment | Corrosion |
|---|---|---|---|---|
| A. | Na₂O.4SiO₂ | Soda Lime Glass | 980° C., 48 hrs | Severe |
| B. | Na₂O.Al₂O₃.3H₂O | Alumina (Al₂O₃) | " | Severe |
| C. | MgCrO₄.7H₂O | Alumina (Al₂O₃) | 980° C., 100 hrs | None |
| D. | " | Alumina (Al₂O₃) | " | " |
| E. | " | Zirconia (ZrO₂) | " | " |
| F. | Polyvinyl Alcohol | Soda lime glass | 980° C., 60 hrs | Severe |
| G. | MgCrO₄.7H₂O | Soda lime glass | " | Moderate |
| H. | " | Fused SiO₂ | " | None |
| I. | " | Pyrex Glass | " | None |
| J. | Polyethelene Glycol | Pyrex Glass | 1040° C., 125 hrs | Severe |
| K. | MgCrO₄.7H₂O | Pyrex Glass | " | Moderate |
| L. | None | Pyrex Glass | " | Severe |
| M. | None | Fused SiO₂ | " | None |
| N. | None | Vycor glass | " | " |
| O. | " | Corning 1723 glass | " | " |
| P. | " | "E" glass | " | " |
| Q. | " | "S" glass | " | " |
| R. | Polyvinyl Alcohol | "E" glass | " | " |
| S. | Polyvinyl Alcohol | O.I. GS-302 glass | " | " |

TABLE 2

Compositions of Glasses

| Glass | Softening Point - °C. | Constituent Nominal Weight Percent | | | | | | |
|---|---|---|---|---|---|---|---|---|
| | | SiO₂ | BaO | Al₂O₃ | MgO | CaO | Na₂O | B₂O₃ |
| Soda lime | 690 | 70 | | | 2.5 | 14 | 14 | |
| PYREX (Corning 7740) | 821 | 81 | | 2 | | | 4 | 13 |
| "E" (Ferro) | 846 | 54 | | 14 | 5 | 18 | 0.5 | 8 |
| GS-302 (Owens Ill.) | 850 est. | 54 | | 9 | 8 | 13 | | 16 |
| 7059 (Corning) | 844 | 49 | 25 | 11 | | | <0.5 | 15 |
| 1723 (Corning) | 908 | 57 | 6 | 15 | 7 | 10 | <1 | 4 |
| "S" (Ferro) | 970 | 65 | | 25 | 10 | | | |
| VYCOR (Corning 7913) | 1530 | 96 | | 1 | | | | 3 |
| 100% Silica (Corning 7940) | 1580 | 100 | | | | | | |

Referring to both tables it may be seen first from the tests B-E that sodium silicate (Na₂O.4SiO₂) binder causes corrosion whereas magnesium chromate (MgCrO₄.7H₂O) does not. Comparing tests A, F, G, it may be seen that soda lime glass, a heretofore preferred particulate, causes corrosion. Pyrex glass at low temperature in Test I did not cause corrosion, but at high temperature in tests J, K, L, it did. Fused silica, Vycor, Corning 1723, "E," "S," and Owens-Illinois GS-302 glass caused no corrosion.

Conclusions may be drawn from the observations. While fused silica and Vycor glass did not produce any attack, as the copending application indicates they are not desired because of their unfavorable hole forming characteristics. That is, glasses useful in the present invention must contain at least 7 weight percent low temperature constituent and these do not. The soda lime glass produces an unacceptable corrosion in nickel superalloys even at low temperature and therefore is undesired, even though it is quite desired in general for hole forming characteristics. The acceptable tested glasses are "E," 1723, "S," and GS-302. It may be inferred that the glass 7059 shown in Table 2 and not in Table 1, would be useful. Analyzing the results it is discovered that a common element in the combinations which induced corrosion is the presence of the alkali metal sodium in the oxide compound Na₂O. Soda lime glass has about 13 weight percent alkali metal oxide, while Pyrex has about 4 percent, and they should not be used. The glasses "E", "S", GS-302, and 1723 contain less than 1 weight percent sodium metal oxide. By inference from the periodic table, oxides of other alkali metals Li, K, Rb, and Cs are to be avoided as well. Accordingly, it is discovered that the glasses suited for nickel superalloy drilling must both meet the criteria set forth in the copending application and in addition contain less than 1 weight percent alkali metal oxide.

Sodium oxide is a favored low temperature constituent of silicate glasses because of its powerful viscosity modifying effect. Other constituents must be substituted to meet the criteria set forth in the copending application for more than 7 weight percent low temperature constituent, a liquid glass viscosity of more than 10 Pa.s at 1400° C. and a softening point greater than 800° C. It is seen from the data herein that the "S," "E," GS-302 and 1723 glasses are variously characterizable as aluminosilicates and borosilicates, wherein boria is the dominant low temperature constituent.

Referring to Table 3 in the copending application, it is seen that glass 3291 is predicted to be useful, while the others are not useful owing to their high alkali metal oxide contents (except for 3489 mentioned below).

The exact alkali metal oxide content of any backer, as opposed to only the particulate, is dependent on the proportions of binder and particulate and their compositions. The tests were conducted with backers having about 75 weight percent particulate; in actual use backers will have from 55-90 percent particulate. The experiments did not indicate that corrosion results will be substantially altered within this range. And of course, the degree to which corrosion occurs in an actual article depends on the composition of the backer residue, not the backer as applied. Since the preferred alkali metal containing binders such as sodium silicate will be soluble, the most likely residue which will cause trouble is that of the particulate. Thus binders having alkali metal content may be used with the low alkali metal content particulates in backers in the practice of the invention. But, due to the uncertainty of composition of residue, the more preferred backer (binder and particulate together) has a total alkali metal oxide of less than 1 weight percent, meaning an alkali metal free binder should be used. Preferred binders are those such as organic binders like polyvinyl alcohol, polyethelene glycol, waxes, etc; or inorganic binders such as magnesium dichromate, metal acetates, nitrates, lactates, etc.

There are other glasses which may appear to be useful such as silicate flint glasses and lead glazes, similar to glass 3489 in Table 3 of the copending application, based on the absence of alkali metal oxide and probable favorable viscosity. But these glasses contain heavy metals such as Bi, Sn, Sb, As, and in particular Pb, which are known to be associated with degraded mechanical properties in superalloys. Thus it is preferred that glass particulates should contain no more than 25 ppm of the aforesaid heavy metals, to avoid contamination therefrom.

Although this invention has been shown and described with respect to a preferred embodiment, it will be understood by those skilled in the art that various changes in form and detail thereof may be made without departing from the spirit and scope of the claimed invention.

I claim:

1. The method of drilling a hole with an energy beam, such as an electron beam, through a workpiece made of a metal alloy, wherein a backer comprised of a binder and ceramic particulate is contacted with the exit surface of the workpiece to generate gaseous products under action of the beam, characterized by said particulate being a glass selected from the group consisting of borosilicates and aluminosilicates and combinations thereof, the particulate comprised of a high temperature constituent in combination with at least 7 weight percent low temperature constituent and having an alkali metal oxide content of less than 1 weight percent, said high temperature constituent converting at least in part to a liquid during drilling and said low temperature constituent converting at least in part to a liquid due to action of the energy beam during drilling.

2. The method of claim 1 characterized by a binder which is a soluble inorganic material free of alkali metal content.

3. The method of claim 1 characterized by a particulate having a heavy metal (Pb, Bi, Sn, Sb, and As) content of less than 25 ppm.

4. The method of claims 1, 2, 3 wherein the glass particulate has a softening point greater than 700° C. and a liquid viscosity of about $10-10^2$ Pa.s at 1400° C.

* * * * *

UNITED STATES PATENT AND TRADEMARK OFFICE
CERTIFICATE OF CORRECTION

PATENT NO. : 4,386,257

DATED : May 31, 1983

INVENTOR(S) : John J. Brennan

It is certified that error appears in the above-identified patent and that said Letters Patent is hereby corrected as shown below:

Column 6, line 18 change "liquid" to --gas--

Signed and Sealed this

Sixteenth Day of August 1983

[SEAL]

Attest:

GERALD J. MOSSINGHOFF

Attesting Officer     Commissioner of Patents and Trademarks